(12) United States Patent
Arora et al.

(10) Patent No.: US 12,487,979 B2
(45) Date of Patent: Dec. 2, 2025

(54) SUBRANGE TRUNCATION OF RECORDS

(71) Applicant: Salesforce, Inc., San Francisco, CA (US)

(72) Inventors: Vaibhav Arora, San Francisco, CA (US); Christopher Drexelius, San Jose, CA (US); Terry Chong, Pleasanton, CA (US); Thomas Fanghaenel, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/312,351

(22) Filed: May 4, 2023

(65) Prior Publication Data

US 2024/0370422 A1    Nov. 7, 2024

(51) Int. Cl.
*G06F 16/22*        (2019.01)
*G06F 16/2455*      (2019.01)

(52) U.S. Cl.
CPC ...... *G06F 16/2246* (2019.01); *G06F 16/2282* (2019.01); *G06F 16/24552* (2019.01)

(58) Field of Classification Search
None
See application file for complete search history.

(56) References Cited

U.S. PATENT DOCUMENTS

| | | | |
|---|---|---|---|
| 10,489,356 B1* | 11/2019 | Shah | G06F 16/211 |
| 10,963,454 B2* | 3/2021 | Fanghaenel | G06F 16/2386 |
| 2017/0132429 A1* | 5/2017 | Bell | H04L 9/0891 |
| 2017/0277744 A1* | 9/2017 | Mohandas | G06F 16/2365 |
| 2019/0236156 A1 | 8/2019 | Fanghaenel et al. | |
| 2020/0097558 A1 | 3/2020 | Fanghaenel | |
| 2021/0377037 A1* | 12/2021 | Antonopoulos | H04L 9/3247 |
| 2022/0067017 A1* | 3/2022 | Wu | G06F 3/0604 |
| 2024/0126750 A1* | 4/2024 | Shergill | G06F 16/2246 |

* cited by examiner

*Primary Examiner* — Kavita Stanley
*Assistant Examiner* — Cao D Vuong
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed that relate to truncating a subrange of records from a database table. A computer system receives a request to truncate the subrange of records. The request specifies a conditional expression that is usable to identify the subrange from other subranges of records of the database table. Before truncating the subrange of records, the computer system determines whether the subrange of records can be truncated from the database table with a single-record subrange truncate operation, regardless of a size of the subrange of records, based on whether the conditional expression satisfies a set of preconditions. Based on determining that the conditional expression satisfies those preconditions, the computer system performs the single-record subrange truncate operation that includes generating a truncate record that causes the subrange of records to be truncated from the database table.

18 Claims, 10 Drawing Sheets

… (1)

SUBRANGE TRUNCATION OF RECORDS

BACKGROUND

Technical Field

This disclosure relates generally to database systems and, more specifically, to various mechanisms for truncating a subrange of records from a database table.

Description of the Related Art

Enterprises routinely implement database management systems (or, simply "database systems") that enable users to store a collection of information in an organized manner that can be efficiently accessed and manipulated. In various cases, a database system implements a log-structured merge tree (LSM tree) having multiple levels that each store data in records as key-value pairs. The database system can include a persistent storage that houses the LSM tree and a database node having a local in-memory cache. During operation, the database node initially writes records into its in-memory cache before later flushing them to the persistent storage. As a part of flushing records, the database node writes the records into new files that are stored in one of the multiple levels of the LSM tree. Over time, those records are rewritten into new files stored in lower levels as the records are merged down the LSM tree.

DETAILED DESCRIPTION

Figure 1:
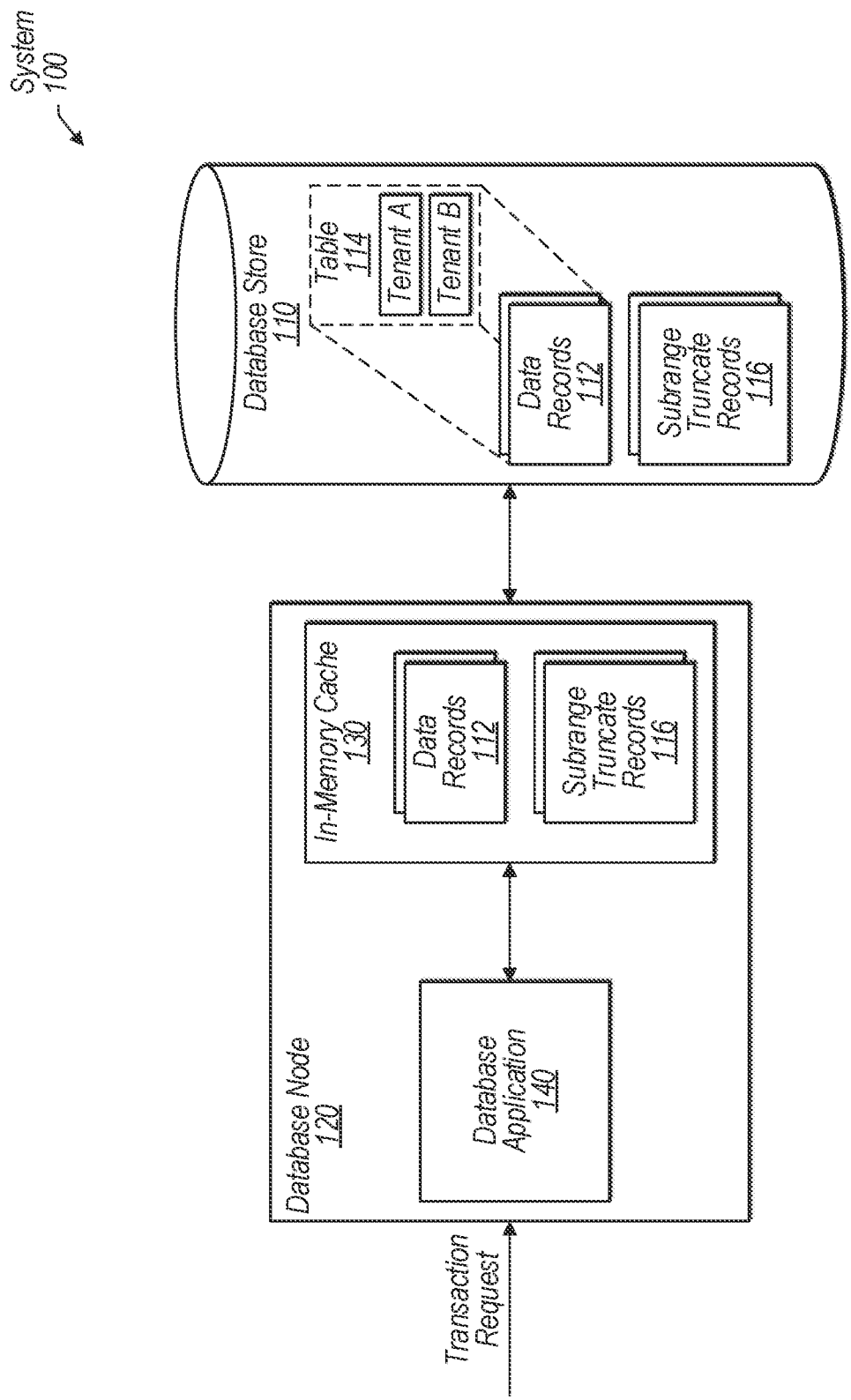
FIG. 1 is a block diagram illustrating example elements of a system having a database store and database node that is capable of truncating a subrange of records, according to some embodiments.

In some implementations, a database system can store records for multiple tenants (e.g., users, organizations, etc.) in the same table (referred to as a "multi-tenant" table). The records of a tenant normally include a tenant identifier (or another marker) that logically separates their records from the records of other tenants in the table. In certain cases, it is desirable to truncate a portion/subrange of the records of a tenant from a multi-tenant table without impacting other tenants of the multi-tenant table. As used herein, the term "truncate" is used in accordance with its well-understood meaning and refers to removing records from a table without removing the table itself. Accordingly, truncating a tenant from a multi-tenant table results in all records of that tenant being removed from that multi-tenant table, and likewise, truncating a table results in all records of that table being removed—the table persists and can be used to store additional records (the records stored in a table can be referred to as "data records").

One approach for truncating records from a table is for a database system to perform a per-record truncate operation in which the database system truncates one record at a time. This can involve the database system writing a truncate record that signifies the truncation of a data record and then removing that data record at a later point in time. This approach, however, can involve writing millions of truncate records if the portion of the table being truncated includes millions of data records. As a result, this per-record truncate approach can take a considerable amount of time for a truncate range with a large number of records and consume a large amount of space due to the number of truncate records that are stored. In some cases, a database system supports a truncate table command and a truncate tenant command that can be used to truncate a table and a tenant from a table, respectively. The database system implements the commands in constant time by writing a truncate record that encompasses the table or the tenant depending on the command. The database system is able to perform these commands due to the physical clustering of the data records of a table in storage. Database systems, however, do not support a truncate portion command that can be used to truncate a portion of a table as that portion may not be contiguous with respect to the clustering of the data records in storage. This disclosure addresses, among other things, the problem of how to truncate a portion/subrange of a table in a manner that does not incur one or more of the deficiencies of the per-record truncate approach discussed above.

In various embodiments described below, a system includes a database store that stores data records for tables and a database node that includes a local in-memory cache. The database node, in various embodiments, executes database transactions that involve writing records data for those tables into the in-memory cache and later flushing them to the database store. During its operation, the database node can receive a request to truncate one or more subranges of data records from a table. The request specifies a conditional expression that can be used to identify and distinguish the one or more subranges from other subranges of records of the particular table. As an example, the conditional expression may be a WHERE clause that specifies one or more clauses that are connected via an OR (e.g., WHERE entityID="Acme" OR entityID="Bowls"), each of those clauses might result in a subrange. Before truncating a subrange, in various embodiments, the database node determines whether the subrange can be truncated from the table with a single-record subrange truncate operation, regardless of a size of that subrange, based on whether the conditional expression satisfies certain preconditions. If the database node determines that the preconditions are satisfied, then the database node performs a single-record subrange truncate operation to truncate that subrange from the table. In various embodiments, that single-record subrange truncate operation involves writing, into the in-memory cache, a truncate record that causes the subrange of records to be truncated from the table. In some cases, the database node performs single-record subrange truncate operations with respect to one or more indexes created on the table to truncate the subrange from those indexes. A conditional expression may identify multiple subranges and thus the database node may perform the single-record truncate operation for each subrange to truncate that subrange from the table. If, however, the database node determines that the preconditions are not satisfied, then the database node may return an error and/or implement a per-record truncate on the one or more subranges.

While a subrange truncate record resides in the in-memory cache of the database node, in various embodiments, the database node prevents queries from accessing the records of the subrange corresponding to that subrange truncate record. Once the in-memory caches becomes full, then the database node may perform a flush operation to flush the subrange truncate record to the database store. As a part of that flush operation, the database node may update a storage catalog used by queries to access records of the database store so that the subrange of records cannot be accessed via the storage catalog by queries. In various embodiments, at a later point in time, the subrange of records is removed from the database store. These techniques may be advantageous as they may allow a subrange of records to be truncated from a table in constant time. In particular, instead of performing a per-record truncate (which can vary in time duration depending on the number of records being truncated), a database system can write one truncate record to cause a subrange to be deleted from a table regardless of a size of the subrange. The use of certain preconditions allows for the database system to identify those subranges capable of being truncated from a database table with a single-record subrange truncate operation. That is, the preconditions may be used to ensure that the subrange being truncated is contiguous in regards to the clustering of the data records in storage. An application of these techniques will now be discussed, starting with reference to FIG. 1.

Turning now to FIG. 1, a block diagram of a system 100 is shown. System 100 includes a set of components that may be implemented via hardware or a combination of hardware and software. As depicted in the illustrated embodiment, system 100 includes a database store 110 and a database node 120. As further shown, database store 110 comprises data records 112 for a table 114 and subrange truncate records 116, and database node 120 comprises an in-memory cache 130 and a database application 140. Also as shown, in-memory cache 130 can store data records 112 and subrange truncate records 116. System 100 might be implemented differently. As an example, system 100 may include multiple database nodes 120 that process transactions to read and write records with respect to database store 110.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, stores, and other entities that are associated with system 100. In various embodiments, system 100 is implemented using a cloud infrastructure that is provided by a cloud provider. Thus, database store 110 and database node 120 may utilize the available cloud resources of that cloud infrastructure (e.g., computing resources, storage resources, etc.) in order to facilitate their operation. As an example, software to implement database node 120 may be stored on a non-transitory computer-readable medium of server-based hardware included in a datacenter and executed in a virtual machine hosted on that server-based hardware. Database node 120 may be implemented without the assistance of a virtual machine or other technologies such as containerization. In some embodiments, system 100 is implemented utilizing local or private infrastructure as opposed to a public cloud.

Database store 110, in various embodiments, includes a collection of information that is organized in a manner that allows for access, storage, and manipulation of that information. Database store 110 may include supporting software (e.g., storage nodes) that enables database node 120 to carry out those operations (e.g., accessing, storing, etc.) on the information that is stored at database store 110. In various embodiments, database store 110 is implemented using a single or multiple storage devices that are connected together on a network (e.g., a storage attached network (SAN)) and configured to redundantly store information in order to prevent data loss. The storage devices may store data persistently and therefore database store 110 may serve as a persistent storage for system 100. In various embodiments, data written to database store 110 by database node 120 is accessible to other database nodes 120 within a multi-node configuration (e.g., a database node cluster or a system having multiple database node clusters spread across different zones provided by a cloud provider). As illustrated, database store 110 stores data records 112 and sub-range truncate records 116.

A data record 112, in various embodiments, is a key-value pair that comprises data and a key usable to look up the data record 112. For example, a data record 112 may correspond to a row in a particular table 114 and specify values for one or more fields of that particular table 114. The key of that data record 112 may be a primary key derived from the values of the data record 112 that are stored for one or more fields of the particular table 114. An example of the use of table fields to define a primary key for a data record 112 is discussed in more detail with respect to FIG. 2A. Requests for data records 112 may provide the corresponding primary keys to those data records 112 to enable database node 120 to access the data records 112 in a more efficient manner as table 114 may be sorted based on primary keys. Also, as discussed in more detail with respect to FIG. 2A, indexes may be created on table 114 that allow for more efficient record searches that are not based on primary keys.

In various embodiments, data records 112 are immutable once written. Accordingly, to update the underlying database construct (e.g., a row within table 114), a new data record 112 has to be written. As a result, a database construct can be associated with multiple data records 112 that are each a different version of the database construct. Data records 112 that correspond to the same database construct can be referred to as "record versions" of the database construct as they represent different versions of that database construct. As an example, a first data record 112 (a first record version) may initially be written that stores certain values for a database row and later a second data record 112 (a second record version) could be written that updates one or more of the values of the database row. Those two records 112 are accessible using the same key, in various embodiments. Accordingly, when performing a key search for a particular key, database node 120 may locate and return the latest record version for that key.

Table 114, in various embodiments, is a database object containing a set of data records 112—that set of data records 112 may be an empty set. While database tables are discussed, in some embodiments, other database objects may be used, such as a document in a non-relational database. In the illustrated embodiment, table 114 stores data records 112 for multiple tenants: tenant A and tenant B; however, table 114 may be a non-tenanted table in other cases—that is, database store 110 can store tenanted and non-tenanted tables 114. In order to logically separate the tenants in table 114, in various embodiments, a given data record 112 of table 114 specifies a tenant identifier that identifies the tenant of the data record 112. The tenant identifier may be part of a longer value that also identifies table 114. Consequently, to locate a data record 112, database node 120 may be provided with a database key that specifies a particular table 114, a tenant associated with the data record 112, and a record identifier. In some embodiments, the underlying data records 112 of a tenant that are included in the same multi-tenant table 114 are clustered together at database store 110.

A subrange truncate record 116, in various embodiments, is a record that causes a set of data records 112 of a keyspace that encompasses less than all data records 112 of a particular table 114 to be truncated. For example, a subrange truncate record 116 may be used to truncate a portion of tenant A's data records 112 in table 114 that correspond to a particular entity (e.g., ACME corporation) with which that tenant A interacts. A subrange truncate record 116 stands in contrast to a tenant truncate record that is used to truncate a tenant from table 114 and a table truncate record that is used to truncate all data records from table 114. In various cases, when a subrange of data records 112 is truncated from table 114, the subrange is also truncated from one or more indexes created based on table 114. A subrange truncate record 116 that truncates a subrange from a given table 114 can be referred to as a "table" subrange truncate record 116 and likewise a subrange truncate record 116 that truncates the subrange from a given index can be referred to as an "index" subrange truncate record 116. If there are one or more indexes on a particular table 114, then when processing a transaction request to truncate a subrange of that table 114, database node 120 may write a table subrange truncate record 116 for that table 114 and one or more index subrange truncate records 116 for the one or more indexes.

Database node 120, in various embodiments, facilitates database services, such as data retrieval, data manipulation, and data storage. In various embodiments, database node 120 is software that is executable on hardware, while in some embodiments, it encompasses both the hardware and the software. The database services may be provided to components internal and external to system 100. For example, database node 120 may receive a transaction request from an application node to process a database transaction. A database transaction is a logical unit of work (e.g., a set of database statements) to be performed in relation to data of database store 110. As an example, processing a database transaction may include executing a SQL SELECT statement to select one or more rows of table 114. The contents of a row may be specified in a data record 112 and thus database node 120 may return one or more requested data records 112 that correspond to the one or more rows. Performing a database transaction can include writing data records 112 to database store 110 as well.

In-memory cache 130, in various embodiments, is a buffer that stores data in memory (e.g., random access memory) of database node 120. HBase™ memstore is one example of an in-memory cache 130. Data records 112 and subrange truncate records 116 may be stored in files as a part of a log-structured merge tree (LSM tree) structure that organizes the files using a level-based scheme. In various embodiments, database node 120 initially writes records into its local in-memory cache 130. As cache 130 becomes full and/or after certain periods of time, database node 120 may flush committed records from in-memory cache 130 to database store 110. As a part of flushing the records, in various embodiments, database nodes 120 writes them into a set of new files at database store 110. As used herein, the term "commit" when used in the context of a transaction or a record is used in accordance with its well-understood meaning and refers to the process of causing changes made during the transaction to be saved and made visible outside of the entity performing the transaction.

Database application 140, in various embodiments, is executable software that provides the database services of database node 120. Accordingly, database application 140 may process database transactions to read records from and write records to database store 110. In various embodiments, database application 140 also manages the previously mentioned LSM tree. This can include maintaining metadata that describes the structural layout of the LSM tree, such as where files are stored within database store 110 and what data records 112 are included in those files. That metadata may be stored in a storage catalog (not shown) at database store 110—a portion of the storage catalog can also be cached in in-memory cache 130—and used by queries executing on database node 120 to retrieve data records 112. Since the storage catalog is used by queries to retrieve data records 112 in some embodiments, the storage catalog may be used by database node 120 to control the queries' access to data records 112. For example, to prevent access to a data record 112, database node 120 may update the storage catalog such that it does not reference that data record 112.

During operation, database application 140 may receive a transaction request to execute a transaction that involves truncating a subrange from a certain table 114, which can be a non-tenanted or tenanted table. That transaction request may specify a subrange truncate command having a conditional expression that is usable to derive one or more subranges. An example of a subrange truncate command is discussed in greater detail with respect to FIG. 2B. Database application 140, in various embodiments, determines whether the subrange truncate command satisfies a set of preconditions. If the preconditions are satisfied, then database application 140 may perform a single-record subrange truncate operation for each affected database object. For example, to truncate a subrange from a particular table 114 and two indexes built on that table 114, database application 140 performs a single-record subrange truncate operation to generate a table subrange truncate record 116 for that table 114 and two single-record subrange truncate operations to generate two index subrange truncate records 116: one for each index. In various embodiments, database application 140 writes the subrange truncate records 116 to in-memory cache 130. As discussed in greater detail with respect to FIG. 4A, database application 140 can perform a flush operation to flush records (e.g., data records 112 and subrange truncate records 116) to database store 110 and update the storage catalog to remove references to the truncated subrange in order to prevent access to the truncated data records 112 by queries via the storage catalog. Also, as discussed in more detail with respect to FIG. 4B, database application 140 can perform a purge operation in which the truncated records 112 are removed.

Figure 2A:
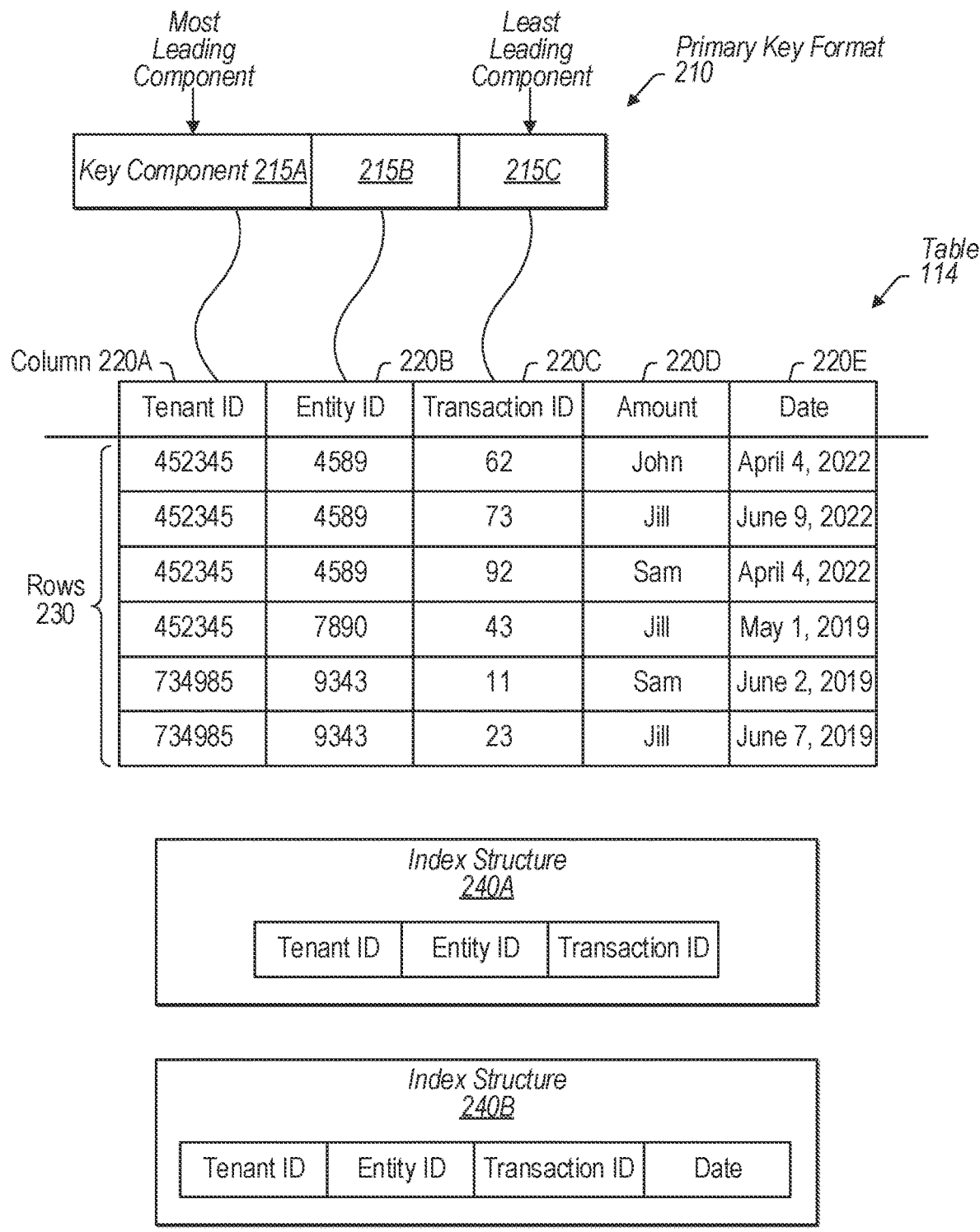
FIG. 2A is a block diagram illustrating example elements of a database table, a primary key format, and index structures, according to some embodiments.

Turning now to FIG. 2A, a block diagram of example elements of a table 114, a primary key format 210, and index structures 240 is depicted. In the illustrated embodiment, table 114 comprises columns 220A-E and a set of rows 230, and primary key format 210 comprises key components 215A-C. Also as shown, there is an index structure 240A that is based on columns 220A-C ("Tenant ID," "Entity ID," and "Transaction ID") of table 114 and an index structure 240B that is based on columns 220A-C and 220E ("Tenant ID," "Entity ID," "Transaction ID," and "Date") of table 114. In some cases, the illustrated embodiment is implemented differently than shown. For example, primary key format 210 may comprise only one key component 215 that corresponds to a single column 220.

Primary key format 210, in various embodiments, defines one or more key components 215 that are used to derive primary keys for rows 230. As used herein, the term "primary key" is used in accordance with its well-understood meaning and refers to a unique key that uniquely identifies a row 230 (that is, its data record 112) from all rows 230 of a table 114 and is usable to access that row 230 (that is, access its data record 112). In various embodiments, the primary key of a row 230 is derived from the row's values that correspond to key components 215A-C of primary key format 210. As shown, key components 215A-C correspond to columns 220A-C, respectively. A column 220, in various embodiments, is a field defining a category of data for which rows 230 provide values. For example, in the illustrated embodiment, column 220A is a tenant ID field, column 220B is an entity ID field, column 220C is a transaction ID field, column 220D is an amount field, and column 220E is a date field. As such, the primary key of a row 230 in the illustrated embodiment is derived from a combination of the row's values for the tenant ID field, entity ID field, and transaction ID field.

Key components 215A-C may also be an ordered composition of columns 220A-C and thus the values of a primary key may be ordered as well. For example, the primary key for the first row 230 may be (452345, 4589, 62)—these values may be concatenated according to their order (i.e., key component 215A is the most leading component, and thus the value of column 220A comes first in the component order) to form that row's primary key (i.e., 452345458962). Other values (e.g., table ID) may precede key components 215A-C in a row's primary key. In some embodiments, table 114 is alphabetically sorted based on each row 230's primary key—i.e., based on columns 220A-C (in the illustrated embodiment) and according to their ordered composition. By sorting rows 230 of table 114 by primary key, record lookups that search for rows 230 (that is, their underlying data records 112) based on primary keys may be performed more efficiently than record lookups that search for rows 230 using database keys derived from a different combination of columns 220 (e.g., a key that corresponds to columns 220D-E). To improve lookups that are based on keys derived from a different combination of columns 220, database node 120 may generate one or more index structures 240.

An index structure 240, in various embodiments, is an index built based on one or more columns 220 of a corresponding table 114. The entries within the index structure 240 are sorted based on the one or more columns 220 and include a subset or all of the values of the rows 230 in the corresponding table 114. The stored values may be enough information that can be used to locate a corresponding row 230 in table 114. That is, in various embodiments, a given index structure 240 includes a sorted copy of a subset of the data in a corresponding table 114, along with pointers (e.g., addresses) to the corresponding rows 230 in that table 114. As an example, index structure 240B may store the values for "Tenant ID," "Entity ID," "Transaction ID," and "Date" for all rows 230 of table 114 and sort them accordingly. Consequently, a search of that index structure for data records 112 that are associated with a particular date may return a set of addresses or primary keys that can be used to locate the actual data records 112 of table 114 (in a subsequent search). Queries that are conditioned based on columns 220 by which table 114 is not ordered, in various embodiments, are executed against index structures 240. While database tables are discussed, in some embodiments, other database objects may be used (e.g., a document in a non-relational database) and index structures 240 may be built based on those objects. As discussed in greater detail with respect to FIG. 3, various ones of the preconditions that may be checked by database application 140 before truncating a subrange are based on the characteristics of the index structures 240 built on the corresponding table 114.

Figure 2B:
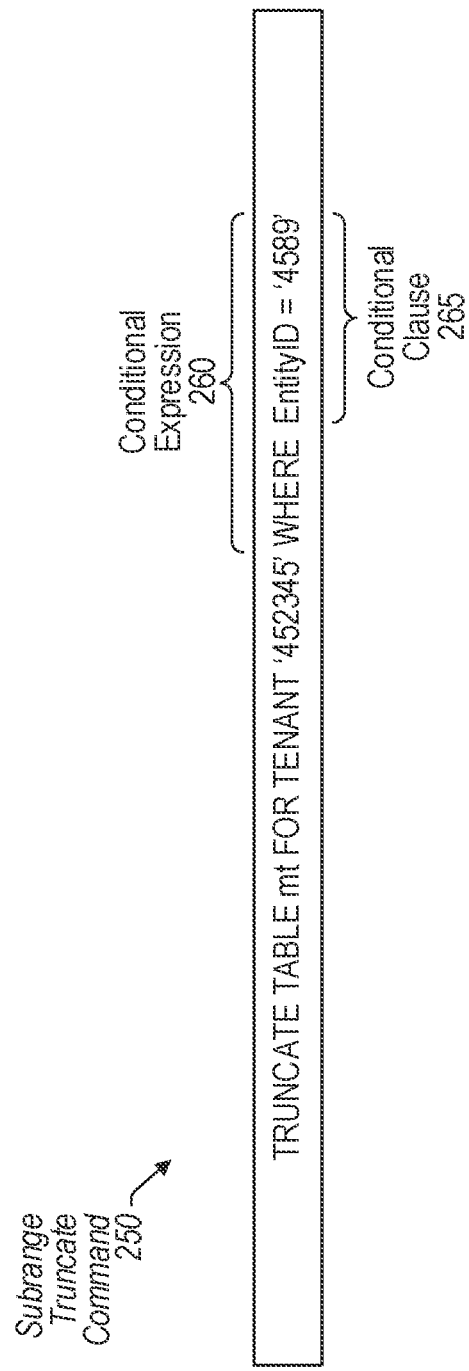
FIG. 2B is a block diagram illustrating an example subrange truncate command having a conditional expression, according to some embodiments.

Turning now to FIG. 2B, a block diagram of an example subrange truncate command 250 is shown. In the illustrated embodiment, subrange truncate command 250 specifies a table 114 ("TABLE mt"), a tenant ID ("452345"), and a conditional expression 260. Also as shown, conditional expression 260 is a WHERE clause that comprises one conditional clause 265 that specifies "EntityID=4589". The illustrated embodiment can be implemented differently than shown. As an example, conditional expression 260 may include multiple conditional clauses 265 (e.g., WHERE EntityID='4589' AND TransactionID='2'). As another example, instead of specifying the tenant ID separately from conditional expression 260, the tenant ID may be included in conditional expression 260 (e.g., WHERE TenantID='452345' AND EntityID='4589').

Subrange truncate command 250, in various embodiments, is a database command that causes database node 120 to truncate one or more subranges of table 114. The subranges can be derived from subrange truncate command 250. For example, in the illustrated embodiment, subrange truncate command 250 specifies the tenant "452345" and the conditional clause 265 "EntityID=4589". Accordingly, the subrange "4523454589" (tenant ID+Entity ID) may be derived by database node 120—that is, the illustrated subrange truncate command 250 causes database node 120 to drop all data records 112 of table "mt" that belong to the tenant "452345" and correspond to the entity "4589." In some cases, multiple subranges may be derived from subrange truncate command 250. For example, subrange truncate command 250 may specify the conditional expression 260 "WHERE entityID='7890' OR entityID='4589'" and thus the subranges may be "4523457890" and "4523454589." As such, if a row 230's primary key (e.g., 452345458962) falls within one of those subranges (e.g., 4523454589), then that row 230 is truncated from the table (e.g., table "mt"). Continuing the prior example, the subranges "4523457890" and "4523454589" would cause the first four rows 230 of table 114 of FIG. 2A to be truncated by database node 120, in various embodiments. But before truncating the one or more subranges of subrange truncate command 250, in various embodiments, database node 120 determines whether subrange truncate command 250 satisfies execution preconditions, as discussed in greater detail with respect to FIG. 3.

Figure 3:
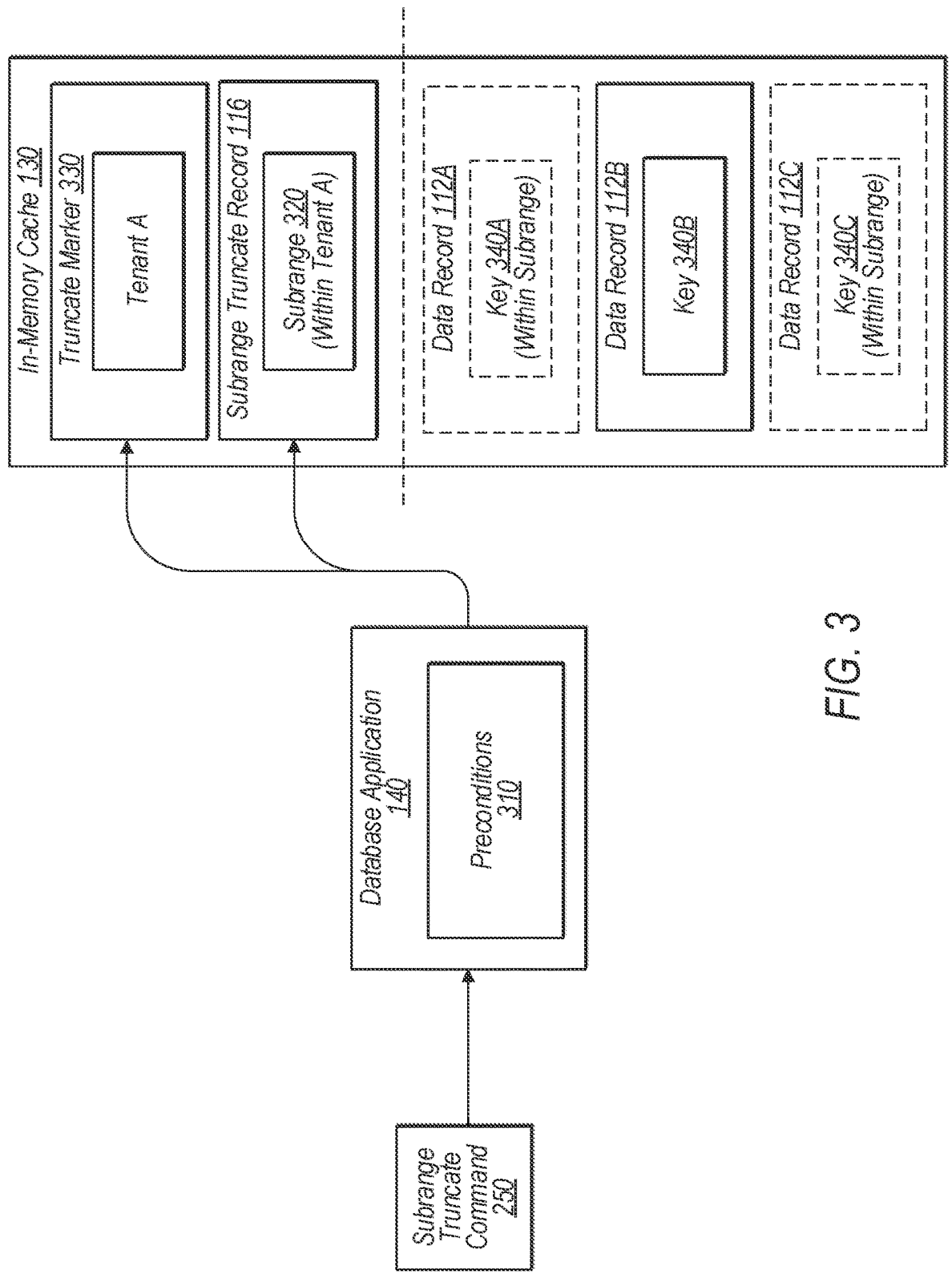
FIG. 3 is a block diagram illustrating example elements of a subrange truncation process that involves generating a subrange truncate record, according to some embodiments.

Turning now to FIG. 3, a block diagram of an example subrange truncation process that involves inserting a subrange truncate record 116 into in-memory cache 130 is depicted. In the illustrated embodiment, there is in-memory cache 130 and database application 140. As further shown, in-memory cache 130 includes data records 112A-C, a subrange truncate record 116, and a truncate marker 330. Also as shown, database application 140 includes preconditions 310 and receives a subrange truncate command 250, and data records 112A-C include keys 340A-C, respectively. The illustrated embodiment might be implemented differently than shown—e.g., truncate marker 330 may not be inserted into in-memory cache 130 as part of the subrange truncation process.

During its operation, database application 140 may receive subrange truncate command 250 as a part of a transaction request to execute a transaction to truncate one or more subranges 320 of a particular table 114. A subrange 320, in various embodiments, defines a subrange of data records 112 that is less than all records of a non-tenanted table 114 or less than all records of a tenant in the case of a multi-tenanted table 114. In some cases, a subrange 320 may cover a subrange encompassing data records 112 of different tenants. If an entity seeks to truncate a table 114 or a tenant, then, in various embodiments, database application 140 receives a table truncate command or a tenant truncate command, not subrange truncate command 250. Before truncating the one or more subranges 320, in various embodiments, database application 140 verifies whether subrange truncate command 250 satisfies certain preconditions 310 that may be used to ensure that each of the subranges 320 can be truncated from the table 114 in constant time using a single-record subrange truncate operation.

One precondition 310, in various embodiments, is that the conditional clauses 265 of subrange truncate command 250 do not reference columns 220 that are not a part of the table's primary key index structure 240. In various embodiments, the primary key index structure 240 indexes the primary keys of a corresponding table 114. Using FIG. 2A, index structure 240A is an example of a primary key index structure 240 as it indexes the primary keys of table 114 of FIG. 2A. Continuing this example, if subrange truncate command 250 included a conditional clause 265 that referenced column 220E (e.g., WHERE Date='Apr. 4, 2022'), then subrange truncate command 250 would not satisfy this precondition 310 as column 220E is not a part of index structure 240A (the table's primary key index structure 240).

Another precondition 310, in various embodiments, is that all the columns 220 between the most leading component 215 and the least leading component 215 referenced in subrange truncate command 250 have to be included in that subrange truncate command 250. Using FIG. 2A as an example, if subrange truncate command 250 referenced column 220C, then subrange truncate command 250 has to reference columns 220A-B to satisfy this precondition 310 since key components 215A-B (corresponding to columns 220A-B) lead key component 215C. As another example, if subrange truncate command 250 referenced column 220B, then subrange truncate command 250 has to reference columns 220A, but not column 220C, in order to satisfy this precondition 310 since key components 215A (column 220A) leads key components 215B (column 220B) while key component 215C (column 220C) does not, according to primary key format 210 of FIG. 2A.

Another one of the preconditions 310, in various embodiments, is that all the secondary index structures 240 created on the specified table 114 have to start with all the leading columns 220 referenced by subrange truncate command 250 and in the order of primary key format 210. Using FIG. 2A as an example, if subrange truncate command 250 specified only columns 220A-B, then subrange truncate command 250 would satisfy this precondition 310 as index structure 240B begins with column 220A (Tenant ID) followed by column 220B (Entity ID), satisfying the ordering of primary key format 210 of FIG. 2A. This precondition 310 may ensure that the one or more subranges 320 can be truncated from all the index structures 240 created on the specified table 114 in constant time. Another precondition 310, in various embodiments, is that OR, LIKE, and substring expressions may only be applied to the last primary key column 220 referenced in subrange truncate command 250. Substring and LIKE may specify only a prefix-range.

If subrange truncate command 250 does not satisfy all preconditions 310, then, in various embodiments, database application 140 returns an error and/or performs a per-record truncate operation for each individual data record 112. But if subrange truncate command 250 satisfies all preconditions 310, then database application 140 writes, to in-memory cache 130, one or more subrange truncate records 116 for the one or more subranges being truncated. In the illustrated embodiment, subrange truncate record 116 is written truncate subrange 320, which affects data record 112A and 112C as shown because they have keys 340 that fall within the key range that defines subrange 320. A key 340, in various embodiments, is a primary key usable to access a corresponding data record 112. In various embodiments, database application 140 also writes, to in-memory cache 130, an index subrange truncate records 116 for each index structure 240 affected by a given one of the one or more subranges.

Once subrange truncate record 116 has been committed, in various embodiments, the query mechanisms of database application 140 observe subrange truncate record 116 and thus do not return truncated data records 112. In some embodiments, database application 140 also writes, to in-memory cache 130, truncate marker 330 to prevent all data records 112 of a non-tenanted table 114 from being accessed while truncate marker 330 resides in in-memory cache 130 or all data records 112 of a tenant in the affected table 114 in the case of a tenanted table 114. Truncate marker 330 may specify a table ID of the affected table 114 in the case of a non-tenant table and a combination of a table ID and a tenant ID of the affected table 114 and tenant in the case of a tenanted table. Truncate marker 330 may be written to a particular location or position in the corresponding table 114 so that the query mechanisms observe truncate marker 330 before returning any data records 112. For example, each fetch/scan may check in-memory cache 130 at the boundary of the tenant's/object's keyspace for any truncate marker 330. If a relevant truncate marker 330 is found, then the query may indicate this to the caller and then fail. In the illustrated embodiment, truncate marker 330 prevents all data records 112 (including non-truncated records 112) of tenant A of the affected table 114 from being returned by queries while truncate marker 330 is present in in-memory cache 130. In various embodiments, the other tenants of the tenanted table 114 are not affected by truncate marker 330 and thus can continue to access their data records 112. Similarly, in various embodiments, portions or all of index structures 240 affected by subrange truncate records 116 are not accessible while those subrange truncate records 116 (or index truncate markers 330) are present in in-memory cache 130.

Truncated data records 112 may remain in system 100 for a period of time. As will be discussed in more detail with respect to FIG. 4A, a flush and purge operation may be performed on in-memory cache 130 to flush subrange truncate records 116 to database store 110 and then to locally drop the truncated data records 112 from a storage catalog. Also, as will be discussed in more detail with respect to FIG. 4B, a background process may perform a purge operation on database store 110 to physically remove the truncated data records 112 from system 100. In some embodiments, the truncated data records 112 are not purged from database store 110—that is, the data records 112 are logically dropped but physically remain in database store 110.

Figure 4A:
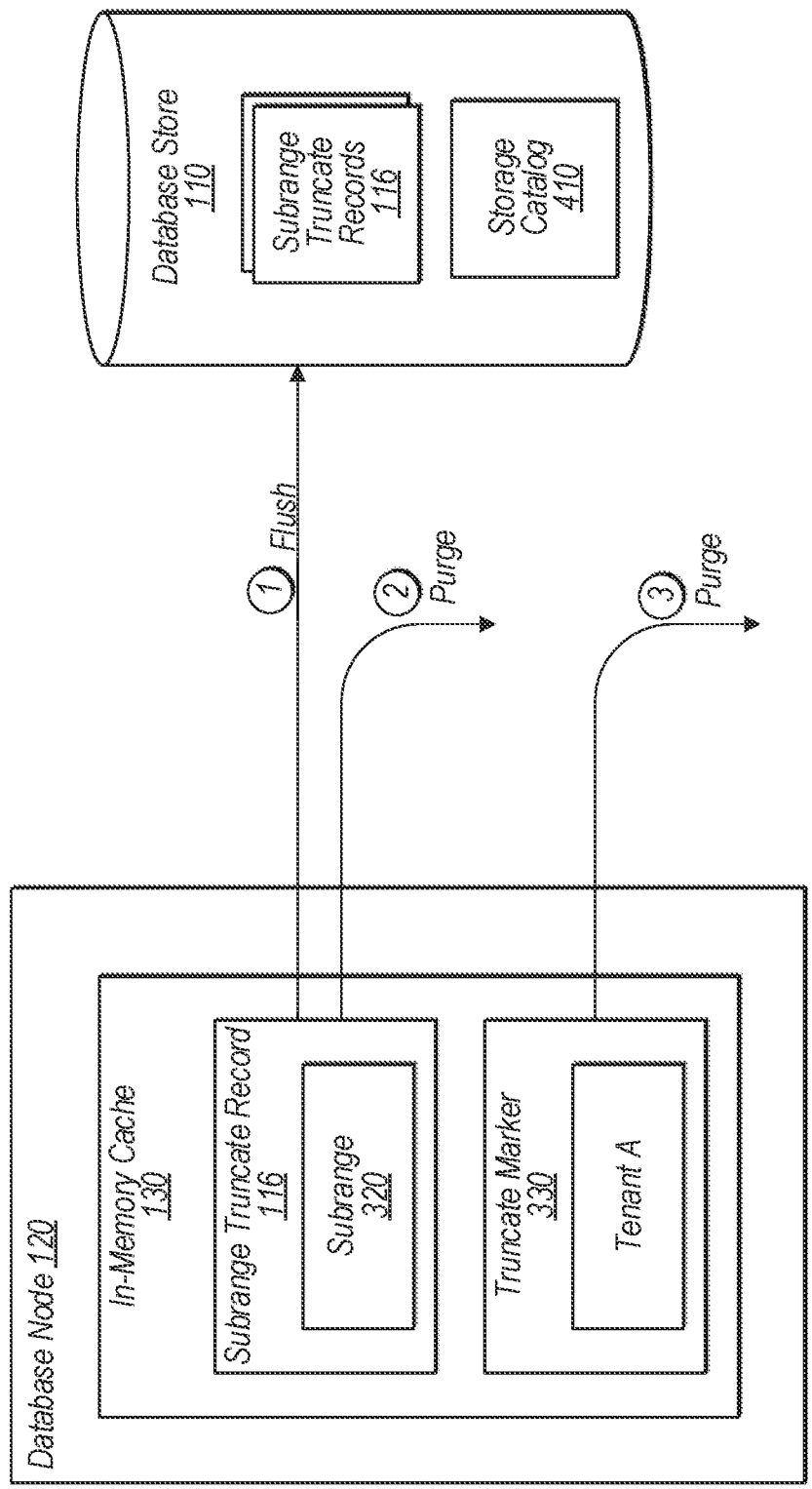
FIG. 4A is a block diagram illustrating example elements of a flush operation to flush a subrange truncate record to the database store, according to some embodiments.

Turning now to FIG. 4A, a block diagram of example elements of a flush operation that is performed to flush records (e.g., a subrange truncate record 116) from in-memory cache 130 to database store 110 is shown. In the illustrated embodiment, there is database node 120 and database store 110. As shown, database node 120 includes in-memory cache 130, and database store 110 includes subrange truncate records 116 and a storage catalog 410. As further shown, in-memory cache 130 includes a subrange truncate record 116 and a truncate marker 330. The illustrated embodiment may be implemented differently than shown. For example, data records 112 may also be flushed with subrange truncate record 116.

When in-memory cache 130 satisfies a fullness threshold or at certain points in database node 120's operation, database node 120 may perform a flush and purge operation with respect to in-memory cache 130. In various embodiments, database node 120 initially flushes records (e.g., data records 112, subrange truncate records 116, etc.) to database store 110 so that copies of those records are preserved at database store 110. As part of flushing those records, database node 120 may update storage catalog 410. Storage catalog 410, in various embodiments, is a data structure that contains information about database store 110, such as the locations of files in database store 110 and the key ranges of those files—the key range(s) of a file can be derived from the data records 112 stored in that file. Storage catalog 410 may serve as a directory that is used by queries executing on database node 120 to locate data records 112 for database keys (e.g., keys 340). Accordingly, in various embodiments, as part of the flush operation, database node 120 modifies storage catalog 410 to remove references to truncate data records 112 such that those truncate data records 112 cannot be accessed by queries via storage catalog 410. In various cases, database node 120 may also modify storage catalog 410 to add references to the flushed subrange truncate records 116 and the new data records 112 being flushed to database store 110 that are not truncated.

After performing the flush operation, in various embodiments, database node 120 then performs a purge operation in which truncated data records 112 are removed from in-memory cache 130 and flushed records (e.g., subrange truncate records 116) are also removed. In some cases, database node 120 removes truncated data records 112 from in-memory cache 130 prior to the other records (e.g., truncate marker 330) in order to avoid a scenario in a query accesses a truncated data record 112 because it does not observe truncate marker 330 or a corresponding subrange truncate record 116 as they have already been purged (in the case that they are purged first). Once the purge operation has finished, in various embodiments, an affected tenant's data records 112 become accessible to queries since truncate marker 330 has been purged and thus is no longer present in in-memory cache 130.

Figure 4B:
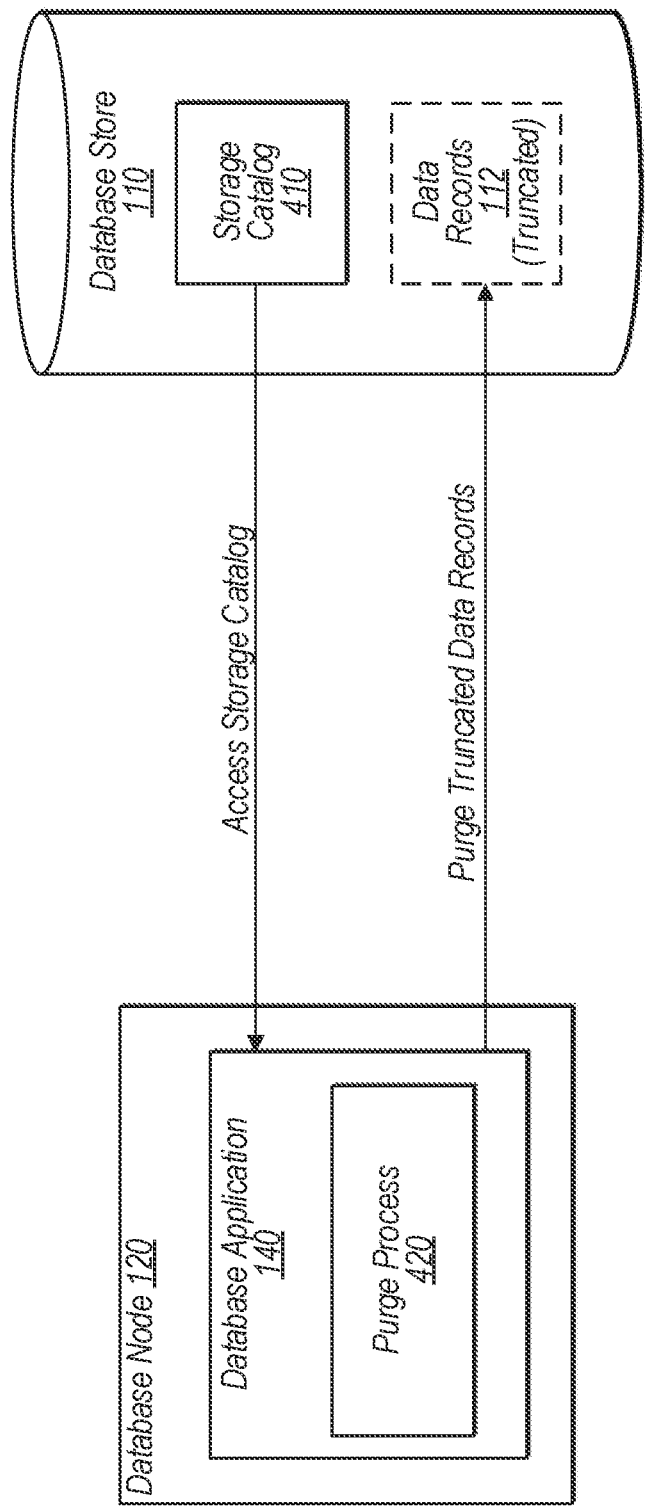
FIG. 4B is a block diagram illustrating example elements of a purge operation to purge truncated records from the database store, according to some embodiments

Turning now to FIG. 4B, a block diagram of example elements of a purge operation that is performed by a purge process 420 to purge truncated data records 112 at database store 110 is shown. In the illustrated embodiment, there is database node 120 and database store 110. As shown, database node 120 includes database application 140 (having purge process 420), and database store 110 includes truncated data records 112 and storage catalog 410. The illustrated embodiment may be implemented differently than shown. As an example, database application 140 may purge truncated data records 112 without the assistance of storage catalog 410.

Purge process 420, in various embodiments, is a background process that periodically (or at particular stages in the execution of database application 140) performs a purge operation on database store 110. That purge operation may be performed as a part of a merge operation executed to merge data records 112 of files residing in one or more levels of an LSM tree into a target level of the LSM tree. As a part of the merge operation, purge process 420 may access storage catalog 410 and observe that there are truncated data records 112 residing in the LSM tree are not referenced in storage catalog 410. Accordingly, purge process 420 may then purge those truncated data records 112 from database store 110. In some embodiments, purge process 420 periodically checks storage catalog 410 against data records 112 in database store 110 and removes those data records 112 that are not referenced by storage catalog 410 independent of a merge operation.

Figure 5A:
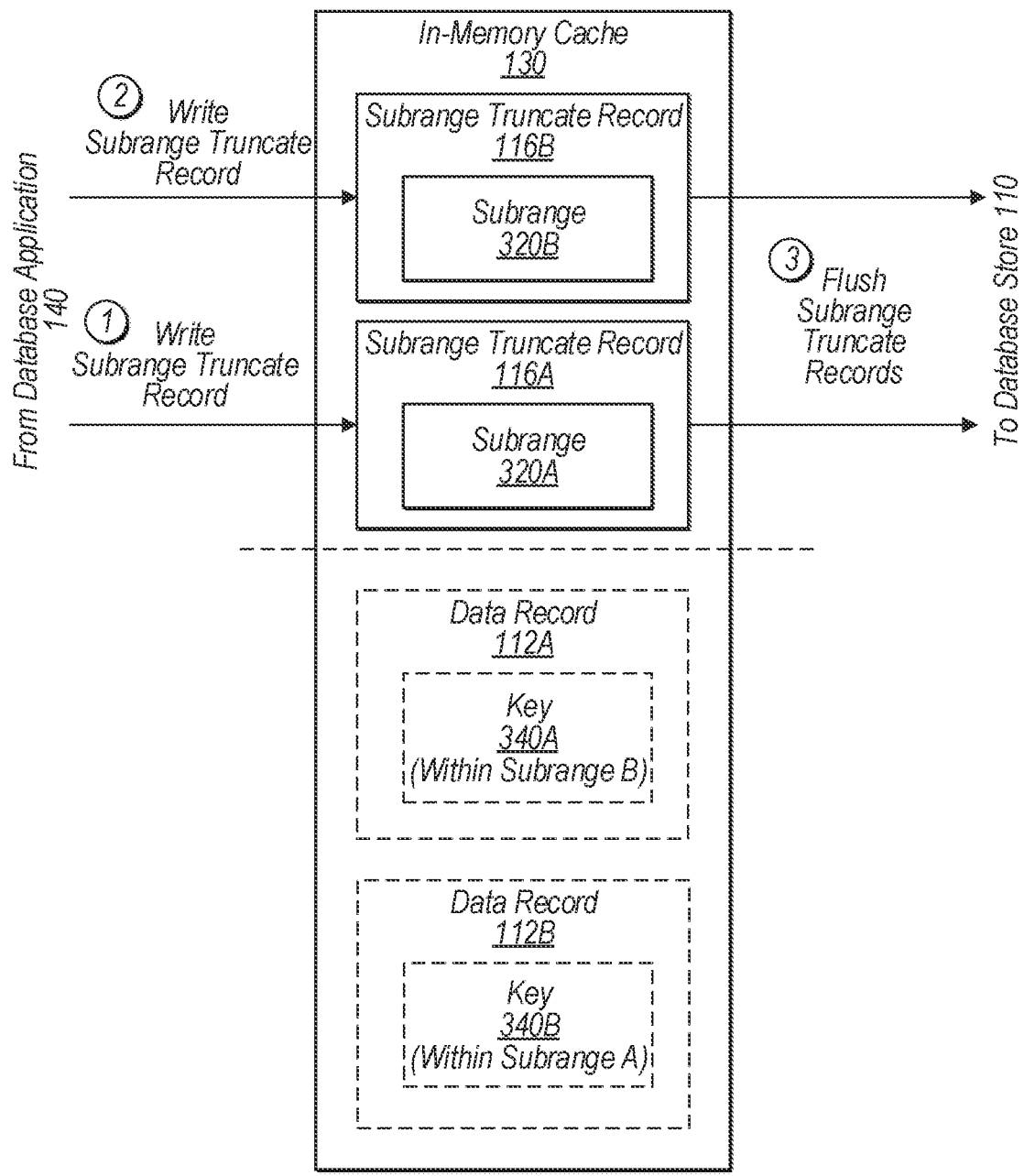
FIG. 5A is a block diagram illustrating multiple subrange truncate records being inserted into an in-memory cache before a flush, according to some embodiments.

Turning now to FIG. 5A, a block diagram of a case in which multiple subrange truncate records 116 are inserted into in-memory cache 130 prior to the occurrence of a flush operation is shown. In the illustrated embodiment, in-memory cache 130 stores data records 112A-B and subrange truncate records 116A-B. Also as shown, subrange truncate records 116A-B truncate subranges 320A and 320B, respectively, that correspond to subrange "A" and "B." As further shown, data record 112A includes a key 340A that falls within the subrange B and data record 112B includes a key 340B that falls within the subrange A.

In various embodiments, multiple subrange truncate records 116 can be written to in-memory cache 130 before a flush operation is performed by database node 120. In some cases, subrange truncate command 250 includes a conditional expression 260 having an OR operator or another operator (e.g., LIKE) that results in multiple subranges 320—e.g., WHERE entityID='4589' OR entityID='7890'. Consequently, database node 120 may write a truncate record 116 for each subrange 320 to in-memory cache 130—e.g., subrange 320A may correspond to entity ID '4589' and subrange 320B may correspond to entityID '7890'. In some cases, multiple requests that result in multiple subranges 320 being truncated can be received by database node 120 before the flush operation is performed by database node 120. Multiple subrange truncate records 116 may be written for the same tenant, or those truncate records 116 may correspond to subportions of different tenants (e.g., subrange 320A may be a subportion of a tenant A and subrange 320B may be a subportion of a tenant B). A truncate marker 330 may be written only for the initial truncate record 116 associated with a tenant, and in the case of subrange truncates for different tenants, there may be multiple truncate markers 330 written to in-memory cache 130—one per affected tenant. When the flush operation is performed, in various embodiments, database node 120 flushes all truncate records 116 to database store 110 from in-memory cache 130 in the same flush operation.

Figure 5B:
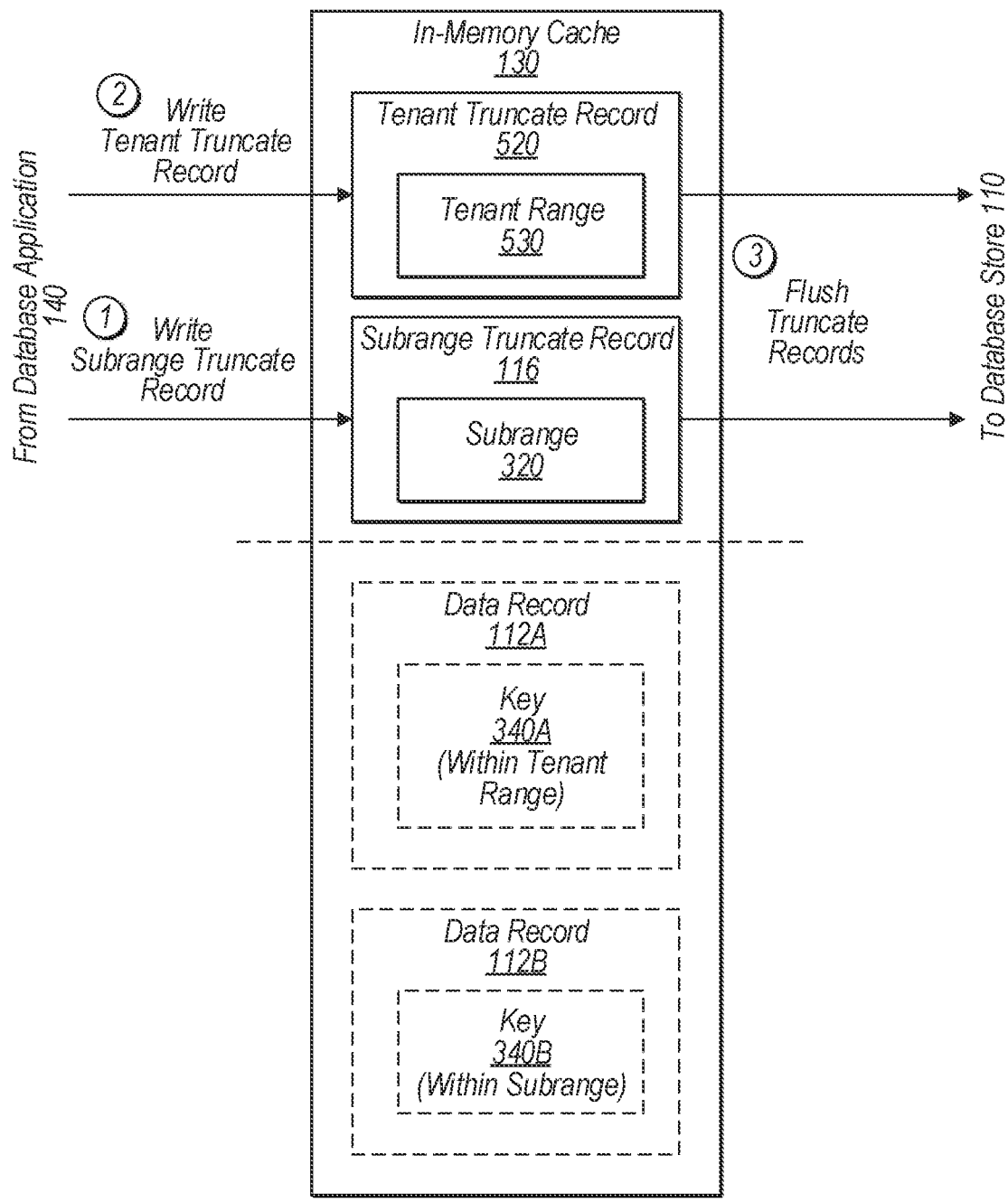
FIG. 5B is a block diagram illustrating a subrange truncate record and a tenant truncate record being inserted into an in-memory cache before a flush, according to some embodiments.

Turning now to FIG. 5B, a block diagram of a case in which a subrange truncate record 116 and a tenant truncate record are inserted into in-memory cache 130 prior to the occurrence of a flush operation is shown. In the illustrated embodiment, in-memory cache 130 stores data records 112A-B, a subrange truncate record 116, and a tenant truncate record 520. As shown, subrange truncate record 116 truncates a subrange 320 and tenant truncate record 520 truncates a tenant range 530. Also as shown, data record 112A includes a key 340A that falls within the subrange of subrange 320 and data record 112B includes a key 340B that falls within the tenant range of tenant range 530.

In various embodiments, a combination of subrange truncate record(s) 116 and tenant truncate record(s) 520 can be written to in-memory cache 130 before a flush operation has been performed by database node 120. For example, database node 120 might receive a request to truncate a subportion of a tenant A and to truncate tenant B from a table 114. As such, database node 120 may write, to in-memory cache 130, subrange truncate record 116 and tenant truncate record 520 to truncate the subportion of tenant A and tenant B, respectively. Tenant range 530 of tenant truncate record 520, in various embodiments, specifies the entire range of data records 112 of the associated tenant stored in a particular table 114. In various cases, subrange truncate records 116 and tenant truncate records 520 correspond to the same tenant. For example, a first subrange truncate record 116 may be written to truncate a first subrange of a tenant, followed by a second subrange truncate record 116 to truncate a second subrange of the tenant, and then a tenant truncate record 520 might be written to truncate the tenant entirely. Subrange truncate records 116 may be written after a tenant truncate record 520 before a flush operation has been performed. For example, a tenant truncate record 520 may be written to truncate a tenant, new data records 112 may then be written for that tenant, and thereafter a subrange truncate record 116 may be written to truncate the new data records 112.

Figure 6:
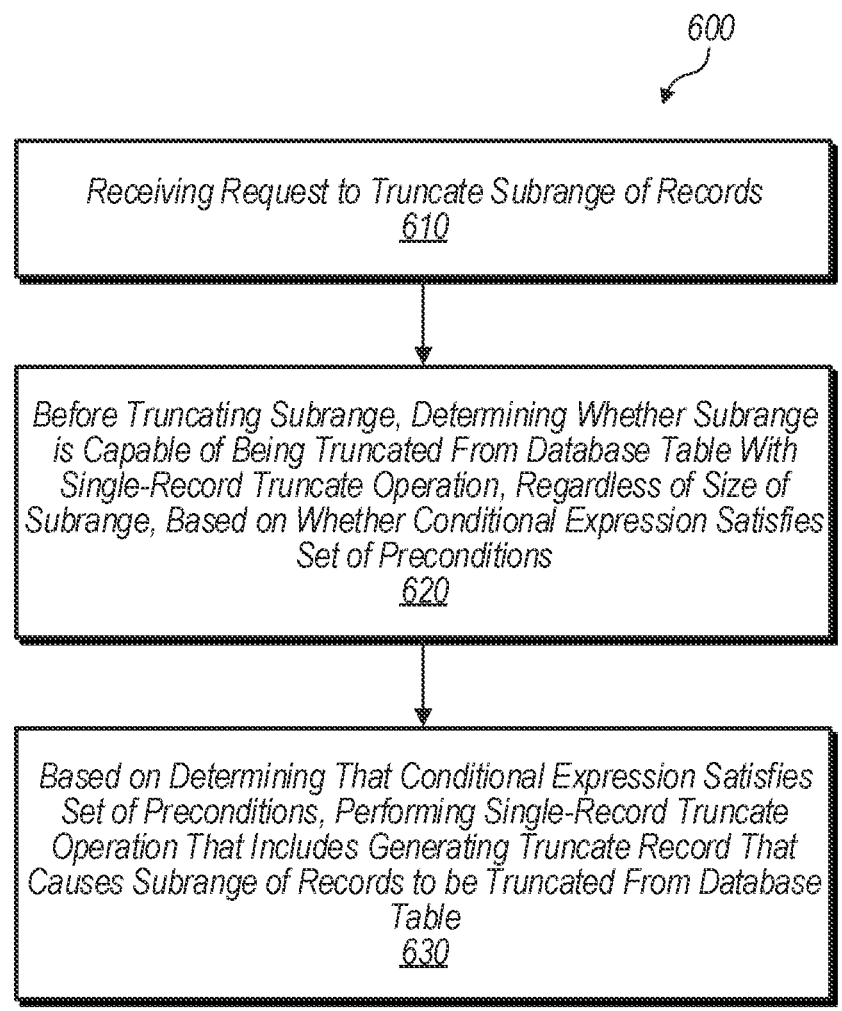
FIG. 6 is a flow diagram illustrating a method for truncating a subrange of records from a database table, according to some embodiments.

Turning now to FIG. 6, a flow diagram of a method 600 is shown. Method 600 is one embodiment of a method performed by a computer system (e.g., database node 120) to truncate a subrange (e.g., a subrange 320) of records (e.g., data records 112) of a database table (e.g., a table 114) that stores a plurality of records. In various embodiments, method 600 is performed by executing a set of program instructions stored on a non-transitory computer-readable medium. Method 600 may involve more or less steps than shown. For example, method 600 may include a step in which the computer system performs, for a given one of one or more indexes (e.g., index structures 240) created on the database table, a single-record subrange truncate operation to truncate the subrange from the given index.

Method 600 begins in step 610 with the computer system receiving a request to truncate the subrange of records. In various embodiments, the request specifies a conditional expression (e.g., conditional expression 260) that is usable to identify the subrange from other subranges of records of the database table. In some instances, different subsets of the plurality of records of the database table correspond to different tenants. Accordingly, the subrange of records may correspond to a subportion of a particular tenant's subset of records.

In step 620, before truncating the subrange, the computer system determines whether the subrange of records is capable of being truncated from the database table with a single-record subrange truncate operation, regardless of the size of the subrange, based on whether the conditional expression satisfies a set of preconditions (e.g., preconditions 310). In various embodiments, the set of preconditions includes a precondition that the conditional expression is not permitted to reference a column (e.g., a column 220) of the database table that is not part of a primary key index (e.g., index structure 240A) that indexes primary keys of the database table. In various embodiments, the set of preconditions includes another precondition that all secondary indexes on the database table have to start with all leading columns in order of the primary key index attributes (e.g., tenant ID, entity ID, and transaction ID) that are referenced in the conditional expression. The database table may be associated with primary keys that are derived from a series of columns of the database table. In various embodiments, the set of preconditions includes another precondition that all columns that occur in the series of columns before the least leading column referenced in the conditional expression have to be included in the conditional expression. In various embodiments, the set of preconditions also includes a precondition that OR and LIKE expressions are applicable only to the least leading column referenced in the conditional expression.

In step 630, based on determining that the conditional expression satisfies the set of preconditions, the computer system performs the single-record subrange truncate operation that includes generating a truncate record (e.g., a subrange truncate record 116) that causes the subrange of records to be truncated from the database table. The conditional expression may be usable to identify a second subrange of records of the database table. Accordingly, based on determining that the conditional expression satisfies the set of preconditions, the computer system may perform another single-record subrange truncate operation to truncate the second subrange of records from the database table. In some embodiments, based on determining that the conditional expression does not satisfy the set of preconditions, the computer system generates a truncate record for each record included in the subrange of records that causes that record to be truncated from the database table.

Based on determining that the conditional expression satisfies the set of preconditions, in various embodiments, the computer system writes, to an in-memory cache (e.g., in-memory cache 130) of the computer system, a tenant marker (e.g., a tenant marker 330) that prevents the particular tenant's subset of records, including the subrange of records, from being accessed while the tenant marker is present in the in-memory cache. The truncate record may be written to the in-memory cache of the computer system. In some embodiments, the computer system maintains a storage catalog (e.g., storage catalog 410) that is used by queries to access records stored at a persistent storage (e.g., database store 110) that stores records of the database table. The computer system may perform a flush operation to flush the truncate record from the in-memory cache to the persistent storage. The flush operation may include modifying the storage catalog such that the storage catalog is not usable by queries to access the subrange of records. In some embodiments, the plurality of records are stored in a log-structured merge tree (LSM tree) that is housed at the persistent storage separate from the computer system. Subsequent to generating the truncate record, the computer system may perform a set of purge operations on the LSM tree to delete the subrange of records from the persistent storage.

In some cases, before performing a flush operation to flush the truncate record to the persistent storage, the computer system receives a request to truncate a tenant corresponding to the subrange and then writes, to the in-memory cache, a tenant truncate record that causes the tenant to be truncated from the database table. The computer system may receive a request to truncate a second subrange of records of the database table. Based on determining that a conditional expression associated with the second subrange of records does not satisfy the set of preconditions, in various embodiments, the computer system performs a per-record truncate operation that involves generating, for each record included in the second subrange of records, a truncate record that causes that record to be truncated from the database table.

Exemplary Computer System

Figure 7:
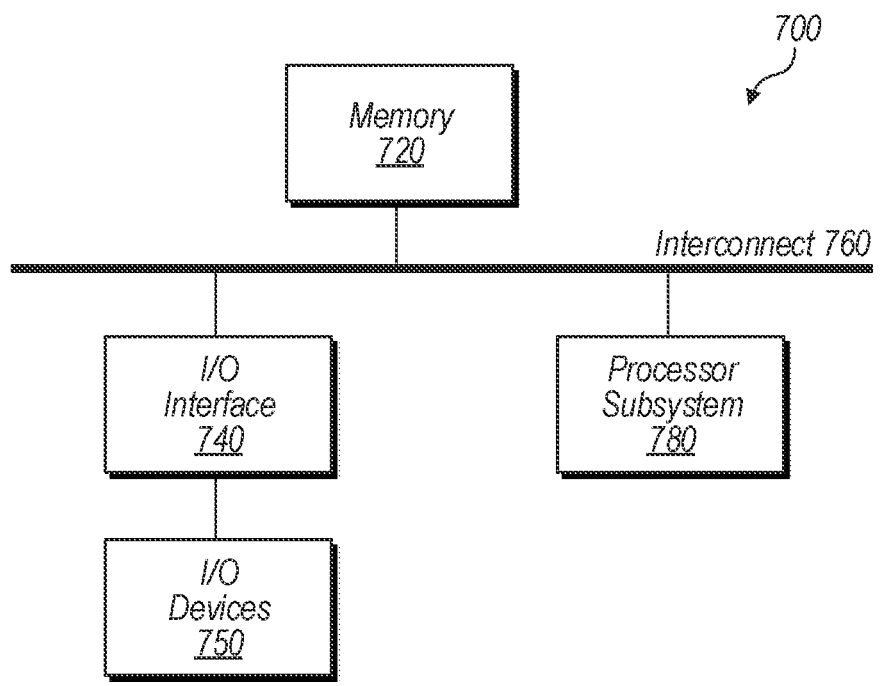
FIG. 7 is a block diagram illustrating elements of a computer system for implementing various systems described in the present disclosure, according to some embodiments.

Turning now to FIG. 7, a block diagram of an exemplary computer system 700, which may implement system 100, database store 110, and/or database node 120, is shown. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement in-memory cache 130, database application 140, and/or purge process 420 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a United States patent application based on this disclosure, it will recite claim elements using the "means for" [performing a function] construct.

What is claimed is:

1. A method to truncate a subrange of records of a database table in constant time using a single truncate record to truncate the subrange, the method comprising:

receiving, by a computer system, a request to truncate the subrange of records, wherein the subrange of records is stored in physical storage, and wherein the request specifies a conditional expression that is usable to identify the subrange from other subranges of records of the database table, wherein the database table is associated with primary keys that are derived from a series of columns of the database table;

before truncating the subrange, the computer system determining whether the subrange is capable of being truncated from the database table with a single-record subrange truncate operation, regardless of a size of the subrange, based on whether the conditional expression satisfies a set of preconditions, wherein the set of preconditions includes a precondition that all columns that occur in the series of columns before a least leading column referenced in the conditional expression have to be included in the conditional expression, and wherein the subrange includes more than one record; and based on determining that the conditional expression satisfies the set of preconditions, the computer system performing the single-record subrange truncate operation that includes generating the single truncate record that causes the subrange of records to be truncated from the database table such that:
subsequent queries to the single-record subrange truncate operation cannot access the subrange of records; and
the subrange of records is marked for subsequent purging from the physical storage.

2. The method of claim 1, wherein the set of preconditions includes a precondition that the conditional expression is not permitted to reference a column of the database table that is not part of a primary key index that indexes the primary keys.

3. The method of claim 1, wherein the set of preconditions includes a precondition that all secondary indexes on the database table have to start with all leading columns in order of primary key index attributes that are referenced in the conditional expression.

4. The method of claim 1, wherein the subrange is associated with one or more indexes, and wherein the method further comprises:
for a given one of the one or more indexes, the computer system performing a single-record subrange truncate operation to truncate the subrange from the given index.

5. The method of claim 1, wherein different subsets of a plurality of records stored in the database table correspond to different tenants of the database table, and wherein the subrange of records corresponds to a subportion of a particular tenant's subset of records.

6. The method of claim 5, further comprising:
based on determining that the conditional expression satisfies the set of preconditions, the computer system writing, to an in-memory cache of the computer system, a tenant marker that prevents the particular tenant's subset of records, including the subrange of records, from being accessed while the tenant marker is present in the in-memory cache.

7. The method of claim 1, wherein the truncate record is written to an in-memory cache of the computer system, and wherein the method further comprises:
maintaining, by the computer system, a storage catalog that is used by queries to access records stored at the physical storage; and
performing, by the computer system, a flush operation to flush the truncate record from the in-memory cache to the physical storage, wherein the flush operation includes modifying the storage catalog such that the storage catalog is not usable by queries to access the subrange of records.

8. The method of claim 1, wherein the subrange of records is stored in a log-structured merge tree (LSM tree) that is housed at the physical storage separate from the computer system, and wherein the method further comprises:
subsequent to generating the truncate record, performing a set of purge operations on the LSM tree to delete the subrange of records from the physical storage.

9. The method of claim 1, further comprising:
receiving, by the computer system, a request to truncate a second subrange of records of the database table; and
based on determining that a conditional expression associated with the second subrange of records does not satisfy the set of preconditions, performing a per-record truncate operation that involves generating, for each record included in the second subrange of records, a truncate record that causes that record to be truncated from the database table.

10. The method of claim 1, wherein the conditional expression specified by the request is usable to identify a second subrange of records of the database table, and wherein the method further comprises:
based on determining that the conditional expression satisfies the set of preconditions, the computer system performing another single-record subrange truncate operation to truncate the second subrange of records from the database table.

11. A non-transitory computer-readable medium having program instructions stored thereon that are capable of causing a computer system to perform operations comprising:
receiving a request to truncate a subrange of records, wherein the subrange of records is stored in physical storage, and wherein the request specifies a conditional expression that is usable to identify the subrange from other subranges of records of a database table;
before truncating the subrange, determining whether the subrange is capable of being truncated with a single-record subrange truncate operation, regardless of a size of the subrange, based on whether the conditional expression satisfies a set of preconditions, and wherein the subrange includes more than one record; and
based on determining that the conditional expression satisfies the set of preconditions, performing the single-record subrange truncate operation that includes generating a single truncate record that causes the subrange of records to be truncated from the database table such that:
subsequent queries to the single-record subrange truncate operation cannot access the subrange of records; and
the subrange of records is marked for subsequent purging from the physical storage; and
based on determining that the conditional expression does not satisfy the set of preconditions, generating a truncate record for each record included in the subrange of records that causes that record to be truncated from the database table.

12. The non-transitory computer-readable medium of claim 11, wherein the database table is associated with primary keys that are derived from a series of columns of the database table, and wherein the set of preconditions includes a precondition that all columns that occur in the series of columns before a least leading column referenced in the conditional expression have to be included in the conditional expression.

13. The non-transitory computer-readable medium of claim 11, wherein the subrange of records corresponds to a particular tenant of a plurality of tenants having records stored in the database table, and wherein the operations further comprise:
   based on determining that the conditional expression satisfies the set of preconditions, inserting, in an in-memory cache of the computer system, a tenant marker that prevents, while the tenant marker resides in the in-memory cache, only those records of the database table that are associated with the particular tenant from being accessed.

14. The non-transitory computer-readable medium of claim 11, wherein the generating of the truncate record includes writing the truncate record to an in-memory cache of the computer system, and wherein the operations further comprise:
   before performing a flush operation to flush the truncate record to the physical storage from the computer system, writing, to the in-memory cache, a tenant truncate record that causes a tenant corresponding to the subrange to be truncated from the database table.

15. A system, comprising:
   at least one processor; and
   a memory having program instructions stored thereon that are executable by the at least one processor to cause the system to perform operations comprising:
      receiving a request to truncate a subrange of records, wherein the subrange of records is stored in physical storage, and wherein the request specifies a conditional expression that is usable to identify the subrange from other subranges of records of a database table, wherein the database table is associated with primary keys that are derived from a series of columns of the database table;
      before truncating the subrange, determining whether the subrange is capable of being truncated with a single-record subrange truncate operation, regardless of a size of the subrange, based on whether the conditional expression satisfies a set of preconditions, wherein the set of preconditions includes a precondition that OR and LIKE expressions are applicable only to a least leading column referenced in the conditional expression, and wherein the subrange includes more than one record; and
      based on determining that the conditional expression satisfies the set of preconditions, performing the single-record subrange truncate operation that includes generating a single truncate record that causes the subrange of records to be truncated from the database table such that:
         subsequent queries to the single-record subrange truncate operation cannot access the subrange of records; and
         the subrange of records is marked for subsequent purging from the physical storage.

16. The system of claim 15, wherein the generating of the truncate record includes writing the truncate record to an in-memory cache of the system, and wherein the operations further comprise:
   before performing a flush operation to flush the truncate record to a the physical storage from the system:
      receiving a request to truncate a second subrange of records; and
      based on determining that a conditional expression associated with the second subrange of records satisfies the set of preconditions, writing, to the in-memory cache, a second truncate record that causes the second subrange of records to be truncated from the database table; and
   performing the flush operation, including modifying a storage catalog used by queries to access records of the database table such that the storage catalog is not usable by queries to access the subrange of records and the second subrange of records.

17. The system of claim 15, wherein the generating of the truncate record includes writing the truncate record to an in-memory cache of the system, and wherein the operations further comprise:
   preventing, while the truncate record resides within the in-memory cache, only records of a particular tenant, who corresponds to the subrange, from being accessed from the database table.

18. The system of claim 15, wherein the conditional expression is usable to identify one or more additional subranges of records of the database table, and wherein the operations further comprises:
   based on determining that the conditional expression satisfies the set of preconditions, performing, for a given one of the one or more additional subranges, a single-record subrange truncate operation to truncate the given subrange of records from the database table.

* * * * *